United States Patent [19]

Doan

[11] 4,233,766

[45] Nov. 18, 1980

[54] TELEPHONE MOUNTING STAND

[76] Inventor: Duc Doan, 7814 S. San Pedro St., Los Angeles, Calif. 90003

[21] Appl. No.: 875,392

[22] Filed: Feb. 6, 1978

[51] Int. Cl.² ............................................. G09F 3/20
[52] U.S. Cl. ........................................ 40/336; 40/16.4
[58] Field of Search .............. 40/16.4, 336, 339, 10 R, 40/16 R

[56] References Cited

U.S. PATENT DOCUMENTS

| | | | |
|---|---|---|---|
| 1,803,667 | 5/1931 | Friedman | 40/16.4 |
| 2,070,652 | 2/1937 | Elmer | 40/152.1 X |
| 3,007,269 | 11/1961 | Jump | 40/610 |
| 3,469,336 | 9/1969 | Halperin | 40/336 |
| 3,587,188 | 6/1871 | Dietrich | 40/336 |

FOREIGN PATENT DOCUMENTS 255576  2/1949  Switzerland .............................. 40/336

*Primary Examiner*—Louis G. Mancene
*Assistant Examiner*—Wenceslao J. Contreras
*Attorney, Agent, or Firm*—Brown & Martin

[57] ABSTRACT

A telephone mounting stand or display holder includes a base member having a plug for tight fitting frictional engagement into the finger sockets of a standard telephone and includes vertically extending support members supporting a generally outwardly opening U-shaped display holding frame having a plurality of slots for receiving and holding sheets of display material. The holder includes a hand grip of a similar configuration to that of the standard telephone formed in the base member, substantially co-extensive with the finger sockets of the standard telephone and further includes a business card holding rack of the back side thereof.

5 Claims, 4 Drawing Figures

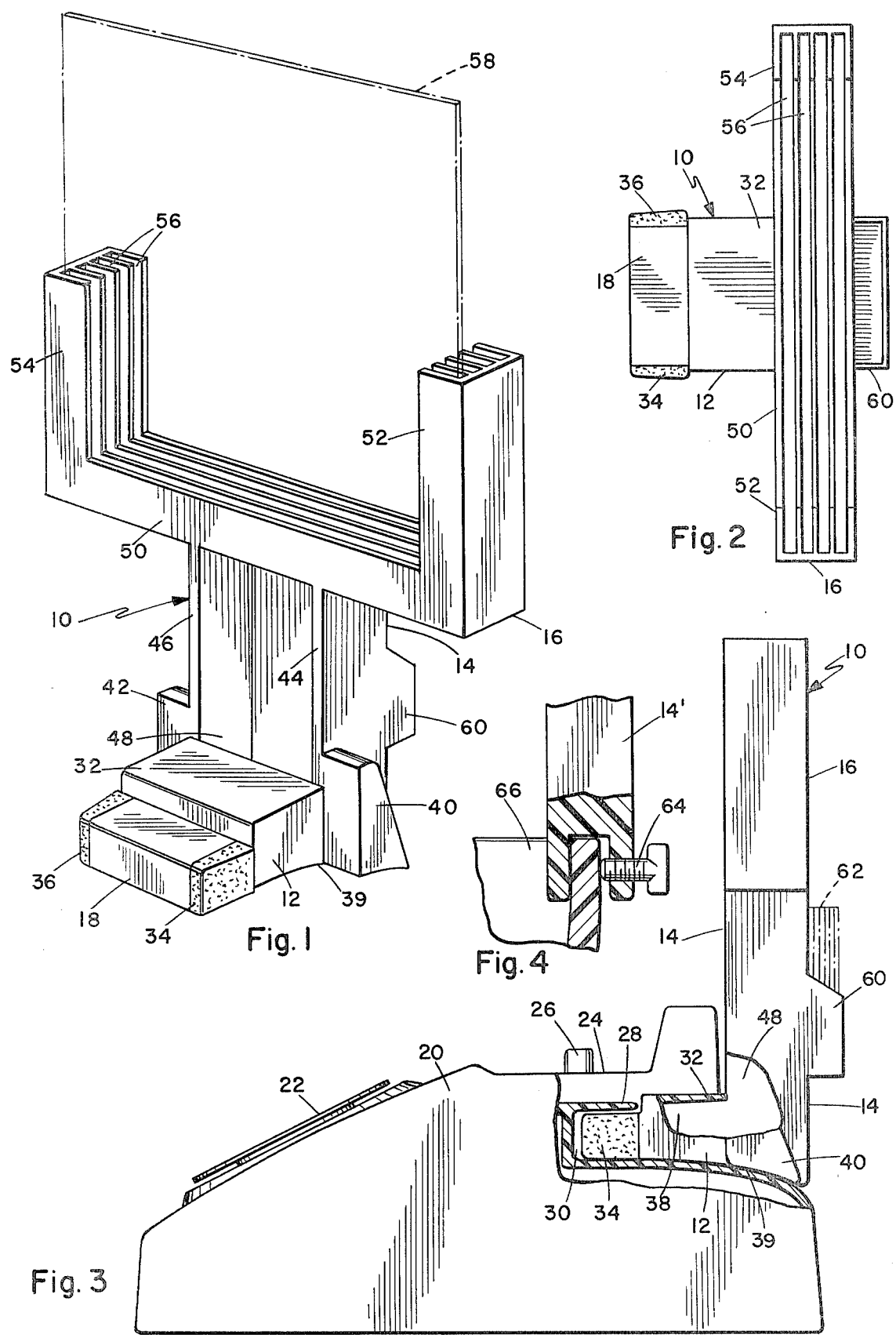

TELEPHONE MOUNTING STAND

BACKGROUND OF THE INVENTION

The present invention relates generally to the display stands and pertains particularly to a telephone mounted display holder.

Many desk type jobs involve the use of bits of information which must be conveniently located and accessible. Many types of information which are utilized quite frequently during a business day such as telephone numbers, addresses, charts, graphs and the like must be handy and readily accessible for use in order to enhance the efficiency of the worker.

It is also desirable in many businesses such as financial institutions, insurance companies and the like to display information for customers and to display advertising of services available. Heretofore information pamphlets and the like for such institutions are typically placed in racks on counters and on desks or merely stacked in piles on such counters and desks.

Accordingly it is desirable that some display rack be available which is conveniently located and quickly accessible to the user to display information and the like to both an office worker and/or his customer.

SUMMARY AND OBJECTS OF THE INVENTION

Accordingly it is the primary object of the present invention to provide an improved display holder that overcomes the above problems of the prior art.

Another object of the present invention is to provide an improved display rack and holder that is convenient and easy to use and is adaptable to hold and display various items of information in a convenient location.

In the courts with the primary aspect of the present invention a display holder includes a base member with a plug for mounting in the finger socket of the standard desk telephone and including a vertically extending support means and a sheet display holding frame at the upper end of the vertically extending support member for holding one or more sheets of information and material.

BRIEF DESCRIPTION OF THE DRAWING

The above and other objects and advantages of the present invention will become apparent from the following description when read in conjunction with the drawings wherein FIG. 1 is a perspective view of the stand of the present invention.

FIG. 2 is a top plan view of the embodiment of FIG. 1.

FIG. 3 is a side elevational view of this stand mounted on a typical standard desk telephone, partially cut away to show the details of attachment.

FIG. 4 illustrates an alternative attachment of the stand to the edge of a bowl or the like.

A DETAILED DESCRIPTION OF A PREFERRED EMBODIMENT

Turning now to the drawings and particularly to FIG. 1 there is illustrated a display holder designated generally by the numeral 10 constructed in accordance with the present invention. The display holder consists essentially of a base member 12 defining hand and gripping means and plug means for plugging into the socket of a standard telephone as will be more fully described.

Connected to an extending upward from the base member 12 is a vertically extending support member generally designated by the numeral 14, and connected at the upper end thereof is a sheet display holding frame designated generally by the numeral 16.

The base member 12 as illustrated in FIGS. 1 through 3 includes a forwardly extending plug 18 having a generally rectangular box shaped configuration and adapted to fit into the socket of a standard telephone. By the term standard desk telephone we mean a telephone of the type illustrated in FIG. 3 of the drawing which is the typical construction and configuration of most commonly used in the United States today. Such a telephone generally has a housing 20 of the general configuration shown with a forward sloping face having a dial rotor 22 mounted thereon, connected to the dialing mechanism within the case or housing 20. The case or housing is provided with an inset rack 24 wherein the head set, not shown, is cradled and including a push button 26 for actuating the switch for disconnecting the telephone circuit. Disposed between and below the head set rack 24 is a hand grip 28 having a finger socket 30 formed thereunder. This permits the phone to be picked up by inserting the fingers into the socket 30 and hooking the grip portion 28 and picking up the telephone for carrying it.

The rack of the present invention is conceived to utilize this hand or finger socket feature of the standard telephone and its adjoining information surface on the housing for mounting a display rack for displaying information in a convenient and readily accessible position.

The base member, previously pointed out, includes a plug 18. This plug extends forward of a hand grip portion 32 of the base and is adapted to extend into the socket 30 of the telephone housing 20. This plug 18 is shaped and adapted for tight fitting frictional engagement with the walls of the socket 30. In this connection suitable means such as a pair of frictional or resilient frictional pads 34 and 36 are secured to opposite ends of the plug 18 for a tight fitting engagement with the side walls of the socket 30. It should be noted that other arrangements of the resilient means may be utilized and other forms of engaging material.

The hand grip 32 is defined by a generally inverted box shaped portion as shown best in FIGS. 1 and 3 and includes a socket 38 for receiving the fingers of an individual in the same manner as socket 30 of the telephone housing. This hand grip means permits the entire telephone and rack to be carried in the same manner as before. The lower face 39 of the base member is preferably shaped to conform to the upper surface of the housing behind the socket 30 as best seen in FIGS. 3 and 4 providing secure support thereof. The base member may also include a pair of feet like members 40 and 42 extending to the side thereof for engagement with the upper surface of the phone housing. This footlike construction provides lateral support for the frame.

The vertically extending support member 14 comprises a pair of vertically extending legs 44 and 46 which are spaced apart a sufficient distance to enable the hand to extend therebetween through an opening 48 just behind the hand grip 32 for engagement with the hand grip 32 and socket 38 thereof.

Secured to the upper end of the legs 44 and 46 is a generally upwardly extending U-shaped display holding frame 16 comprising a laterally extending bar 50 having a pair of vertically extending legs 52 and 54. The horizontal bar and the pair of legs 52 and 54 are all formed with continuous plurality of sheet receiving slots 56, as best seen in FIGS. 1 and 2, for receiving a plurality of sheets of material such as that shown in phantom at 58 in FIG. 1. Any number of slots may be provided for receiving any number of sheets of display or information material. The support frame 16 may also have other configurations, although the vertically extending U-shape as illustrated having the plurality of slots is the preferred embodiment. It will be appreciated that any number of sheets of material may be placed in any one of the plurality of slots. Moreover it would be appreciated that the sheets must be of sufficient strength to support themselves in the vertical position, or be encompassed by suitable means for that purpose. For example ten sheets of material such as sheets of paper may be mounted between thin sheets of glass or sheets of transparent plastic and supported within the frame. Display sheets of cardboard and such stiff material of course may not be enclosed within a stiffening holder.

The display holder of the present invention can of course be utilized for display of many useful items of information such as telephone lists, addresses and the like. It may also be utilized for a display of photographs, advertising illustrations and information and the like. It will also be appreciated that the forward portion of the rack may hold information sheets such as telephone listings, while the rear slots may hold advertising display oriented for viewing the opposite side of the rack. In this manner the holder can be used both as an information holder for the worker as well as holding advertising display for the benefit of his customers.

A holder 60 for business cards 62 may also be included as a feature of the stand.

Other features and construction of the invention are of course obvious within the spirit and scope of the invention. For example, in FIG. 4 the base member may take on any number of configurations such as that of clamp 64 for clamping to the edge of a bowl 66. Other construction could include an ashtray or the like and need not be confined into the illustrated preferred embodiment.

While the present invention has been illustrated and described by means of a specific embodiment it is to be understood that numerous changes and modifications may be made therein without departing from the spirit and scope of the invention as defined in the appending claims.

What is claimed is:

1. A display holder comprising:
    a base member shaped for defining a plug for fitting into tight fitting frictional engagement with a hand grip socket of a standard desk telephone and including means defining a hand grip with a finger receiving recess for gripping said base for carrying said holder and associated telephone;
    a vertically extending support member secured to said base and extending upward therefrom,
    a sheet display holding frame secured to the upper end of said vertically extending support member and including at least a slot for receiving and supporting at least one sheet of display material in a substantially vertical plane wherein said vertically extending support member comprises a pair of spaced apart legs, and
    said hand grip extends horizontally between said legs and said recess is co-extensive with the hand grip socket of a standard desk telephone.

2. The display holder of claim 1 wherein said holding frame is of a generally upwardly opening U-shaped configuration.

3. The display holder of claim 2 wherein said holding frame includes a plurality of slots for holding a plurality of sheets of display material.

4. A display holder comprising:
    a base member, shaped for defining a plug for fitting into tight fitting frictional engagement with a hand grip socket of a standard desk telephone, and said plug includes resilient means for resilient frictionally engaging at least a finger socket in a desk telephone; said resilient means comprises a pair of resilient pads on opposite sides of said plug;
    a vertically extending support member secured to said base and extending upward therefrom, and
    a sheet display holding frame secured to the upper end of said vertically extending support; member and including at least a slot for receiving and supporting at least one sheet of display material in a substantially vertical plane.

5. A display holder comprising:
    a base member,
    a vertically extending support member comprising a pair of spaced apart legs extending upwardly from said base member,
    said base member includes means defining a hand grip extending transverse between said legs and including a finger receiving recess extending forwardly beneath said hand grip; and
    a sheet display holding frame secured to the upper end of said vertically extending support member and including at least a slot for receiving and supporting at least one sheet of display material in a substantially vertical plane.

* * * * *